US012731477B2

(12) United States Patent
Choi et al.

(10) Patent No.: US 12,731,477 B2
(45) Date of Patent: Sep. 8, 2026

(54) APPARATUS AND METHOD FOR WARNING VEHICLE ENTRY INTO DANGEROUS AREA

(71) Applicants: Hyundai Motor Company, Seoul (KR); Kia Corporation, Seoul (KR)

(72) Inventors: Daehan Choi, Hwaseong-Si (KR); Suhyeon Chae, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 71 days.

(21) Appl. No.: 18/893,511

(22) Filed: Sep. 23, 2024

(65) Prior Publication Data

US 2025/0191455 A1 Jun. 12, 2025

(30) Foreign Application Priority Data

Dec. 8, 2023 (KR) ........................ 10-2023-0177523

(51) Int. Cl.

| | |
|---|---|
| ***G08B 21/18*** | (2006.01) |
| ***B60W 50/14*** | (2020.01) |
| ***G08B 25/00*** | (2006.01) |
| ***G08B 25/10*** | (2006.01) |
| ***H04W 4/021*** | (2018.01) |
| ***H04W 4/40*** | (2018.01) |
| ***H04W 4/90*** | (2018.01) |

(52) U.S. Cl.

CPC ............. *G08B 21/18* (2013.01); *B60W 50/14* (2013.01); *G08B 25/008* (2013.01); *G08B 25/10* (2013.01); *H04W 4/021* (2013.01); *H04W 4/40* (2018.02); *H04W 4/90* (2018.02); *B60W 2050/143* (2013.01)

(58) Field of Classification Search

CPC ..... G08B 21/18; G08B 25/008; H04W 4/021; H04W 4/40; H04W 4/90; B60W 50/14; B60W 2050/143; B60W 2520/10

See application file for complete search history.

(56) References Cited

U.S. PATENT DOCUMENTS

| | | | | |
|---|---|---|---|---|
| 6,853,311 | B2 * | 2/2005 | Taniguchi | B60Q 9/008 340/436 |
| 12,022,353 | B2 * | 6/2024 | Ong | H04W 4/022 |
| 2011/0050461 | A1 * | 3/2011 | Pixley | G08G 1/056 340/933 |
| 2020/0339143 | A1 * | 10/2020 | Kozlowski | G06V 20/58 |
| 2024/0349012 | A1 * | 10/2024 | Hughes | G06Q 10/047 |

FOREIGN PATENT DOCUMENTS

| | | | | |
|---|---|---|---|---|
| EP | 4002323 | B1 * | 8/2024 | B60W 40/114 |

* cited by examiner

*Primary Examiner* — John A Tweel, Jr.

(74) *Attorney, Agent, or Firm* — MORGAN, LEWIS & BOCKIUS LLP

(57) ABSTRACT

An apparatus for warning vehicle entry into a dangerous area includes: a monitoring period calculator determining a first monitoring period based on a driving speed of a vehicle and a distance from the vehicle to a second dangerous area nearest to the vehicle after an initial first alarm is transmitted as the vehicle enters a first dangerous area; a dangerous area entry detector determining whether the vehicle enters the dangerous area in every first monitoring period; and an alarm transmitter transmitting a second alarm when the vehicle entry into the second dangerous area is detected.

19 Claims, 5 Drawing Sheets

MONITORING PERIOD CALCULATOR — 110

DANGEROUS AREA ENTRY DETECTOR — 120

ALARM TRANSMITTER — 130

FIG. 3

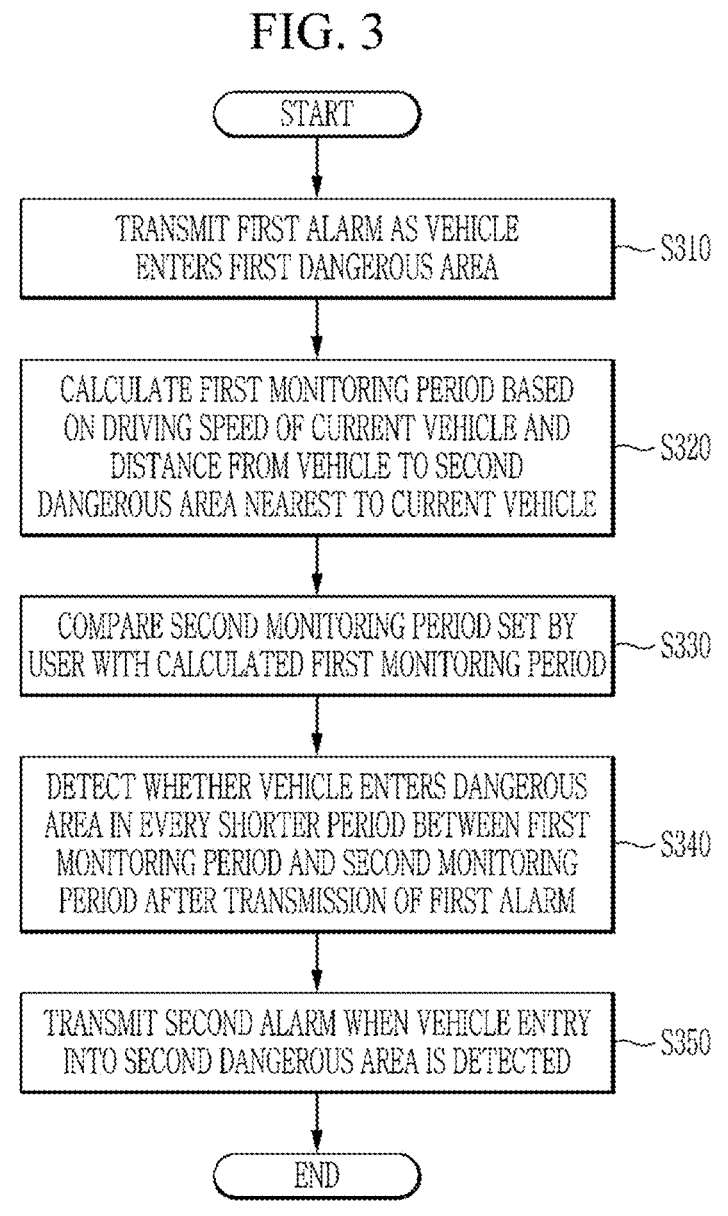

START

TRANSMIT FIRST ALARM AS VEHICLE ENTERS FIRST DANGEROUS AREA — S310

CALCULATE FIRST MONITORING PERIOD BASED ON DRIVING SPEED OF CURRENT VEHICLE AND DISTANCE FROM VEHICLE TO SECOND DANGEROUS AREA NEAREST TO CURRENT VEHICLE — S320

COMPARE SECOND MONITORING PERIOD SET BY USER WITH CALCULATED FIRST MONITORING PERIOD — S330

DETECT WHETHER VEHICLE ENTERS DANGEROUS AREA IN EVERY SHORTER PERIOD BETWEEN FIRST MONITORING PERIOD AND SECOND MONITORING PERIOD AFTER TRANSMISSION OF FIRST ALARM — S340

TRANSMIT SECOND ALARM WHEN VEHICLE ENTRY INTO SECOND DANGEROUS AREA IS DETECTED — S350

END

S410
ALARM FOR FIRST ENTRY INTO DANGEROUS AREA
S420
$I_{new}(s) = D_{min}(m)/V_{max}(m/s)$
S430
$(I_{old} - T) > I_{new}$ ?
YES
NO
S441
$T >= I_{new}$ ?
YES
NO
S442
$T >= I_{old}$ ?
NO
S450
DOES VEHICLE EXIST IN SET DANGEROUS AREA?
YES
NO
S460
DOES VEHICLE EXIST IN NEW DANGEROUS AREA?
YES
NO
S471
ALARM FOR ENTRY INTO NEW DANGEROUS AREA
S481
T = 0
S472
$(I_{old} - T) > I_{new}$ ?
YES
NO
S482
ALARM FOR MAINTAINING EXISTING DANGEROUS AREA
S490
T = 0

FIG. 5

APPARATUS AND METHOD FOR WARNING VEHICLE ENTRY INTO DANGEROUS AREA

CROSS-REFERENCE TO RELATED APPLICATION

The present application claims priority to Korean Patent Application No. 10-2023-0177523 filed on Dec. 8, 2023, the entire contents of which is incorporated herein for all purposes by this reference.

BACKGROUND OF THE PRESENT DISCLOSURE

Field of the Present Disclosure

The present disclosure relates to an apparatus and a method for warning vehicle entry into a dangerous area, and more particularly, to an apparatus and a method for warning vehicle entry into a dangerous area which may prevent omission of the warning of the vehicle entry into the dangerous area.

Description of Related Art

A "geo fence" or a "geofence" may refer to technology for establishing a virtual boundary. This technology may mainly use a location-based service such as a global positioning system (GPS) or a radio frequency identification (RFID) tag to monitor entry into or access to a specific area. A geofence alarm (or geo fence alert) may transmit an alarm to a manager when a specific device or vehicle enters or leaves a designated geofence area.

The geofence alarm of the vehicle may monitor a vehicle location in one second period before first violation (or vehicle entry into a dangerous area) occurs, and transmit the alarm when the vehicle entry into a dangerous area first occurs. After the first violation occurs, the monitoring may be performed only in a period set by a user, and the alarm may be transmitted when the vehicle entry into a dangerous area is confirmed at a corresponding time point.

In the instant case, there is a problem in which the alarm is not transmitted when the vehicle passes by another dangerous area in the next alarm period after the first violation occurs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for warning vehicle entry into a dangerous area that monitors vehicle entry into a new area by use of maximum speed information of a vehicle and a distance between a current location of the vehicle and its nearest area even before a period set after a first predetermined area alarm occurs.

The present disclosure attempts to provide an apparatus and a method for warning vehicle entry into a dangerous area to improve monitoring reliability by setting a monitoring period based on a vehicle speed and a distance to the next area.

According to an exemplary embodiment of the present disclosure, provided is an apparatus for warning vehicle entry into a dangerous area including: a monitoring period calculator determining a first monitoring period based on a driving speed of a vehicle and a distance from the vehicle to a second predetermined area nearest to the vehicle after an initial first alarm is transmitted as the vehicle enters a first predetermined area; a dangerous area entry detector determining whether the vehicle enters the second predetermined area in every first monitoring period; and an alarm transmitter transmitting a second alarm in response that the vehicle entry into the second predetermined area is detected.

The monitoring period calculator may determine, as the first monitoring period, a value obtained by dividing the distance to the second predetermined area by the driving speed of the vehicle.

The driving speed of the vehicle may be determined as a maximum speed in a current driving pattern of the vehicle.

The dangerous area entry detector may compare a second monitoring period set by a user with the first monitoring period to determine whether the vehicle enters the second predetermined area in every first monitoring period in response that the first monitoring period is shorter than the second monitoring period, and determine whether the vehicle enters the second predetermined area in every second monitoring period in response that the first monitoring period is longer than the second monitoring period.

The dangerous area entry detector may compare a value obtained by subtracting an elapsed time after the first alarm from a second monitoring period set by the user with the determined first monitoring period to determine whether the vehicle enters the second predetermined area in every first monitoring period in response that the first monitoring period is shorter than the obtained value, and determine whether the vehicle enters the second predetermined area with the value obtained by subtracting the elapsed time after the first alarm from the second monitoring period as a monitoring period in response that the first monitoring period is longer than the obtained value.

The monitoring period calculator may redetermine a new monitoring period based on the driving speed of the vehicle and a distance from the vehicle to a third predetermined area nearest to the vehicle, after the second alarm is transmitted.

The monitoring period calculator may redetermine a monitoring period based on the driving speed of the vehicle and a remaining distance of the vehicle to the second predetermined area in response that no vehicle entry into the second predetermined area is detected in every first monitoring period.

According to another exemplary embodiment of the present disclosure, provided is a method for warning vehicle entry into a dangerous area including: transmitting a first alarm as a vehicle enters a first predetermined area; determining a first monitoring period based on a driving speed of the vehicle and a distance from the vehicle to a second predetermined area nearest to the vehicle; determining whether the vehicle enters the second predetermined area in every first monitoring period after the transmission of the first alarm; and transmitting a second alarm in response that the vehicle entry into the second predetermined area is detected.

The determining of the first monitoring period may further include determining, as the first monitoring period, a value obtained by dividing the distance to the second predetermined area by the driving speed of the vehicle.

The driving speed of the vehicle may be determined as a maximum speed in a current driving pattern of the vehicle.

The determining of the first monitoring period may further include comparing a second monitoring period set by a user with the first monitoring period to determine whether the vehicle enters the second predetermined area in every first monitoring period in response that the first monitoring period is shorter than the second monitoring period, and determine whether the vehicle enters the second predetermined area in every second monitoring period in response that the first monitoring period is longer than the second monitoring period.

The determining of the first monitoring period may further include comparing a value obtained by subtracting an elapsed time after the first alarm from a second monitoring period set by the user with the determined first monitoring period to determine whether the vehicle enters the second predetermined area in every first monitoring period in response that the first monitoring period is shorter than the obtained value, and determine whether the vehicle enters the second predetermined area with the value obtained by subtracting the elapsed time after the first alarm from the second monitoring period as a monitoring period in response that the first monitoring period is longer than the obtained value.

The method may further include redetermining a new monitoring period based on the driving speed of the vehicle and a distance from the vehicle to a third predetermined area nearest to the vehicle, after the second alarm is transmitted.

The method may further include redetermining a monitoring period based on the driving speed of the vehicle and a remaining distance of the vehicle to the second predetermined area in response that no vehicle entry into the second predetermined area is detected in every first monitoring period.

The apparatus and the method for warning vehicle entry into a dangerous area according to the exemplary embodiments of the present disclosure may monitor the vehicle entry into the new area by use of the maximum speed information of the vehicle and the distance between the current location of the vehicle and its nearest area even before the period set after the first predetermined area alarm occurs, thereby improving the reliability in the warning alarm of the vehicle entry into the area.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 is a block diagram of an apparatus for warning vehicle entry into a dangerous area according to an exemplary embodiment of the present disclosure.

FIG. 3 is a flowchart of a method for warning vehicle entry into a dangerous area according to another exemplary embodiment of the present disclosure.

FIG. 5 is a view for explaining a computing device according to various exemplary embodiments of the present disclosure.

Figure 1:
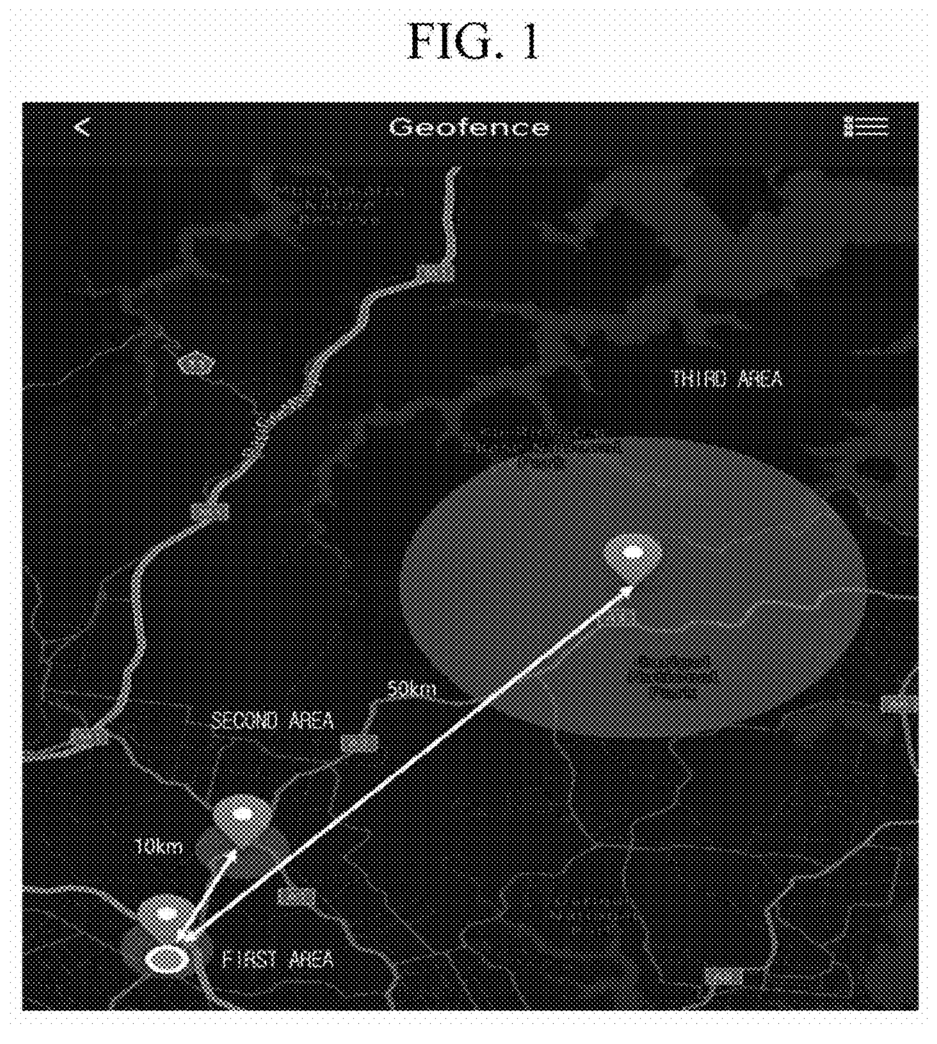
FIG. 1 is a view showing a warning alarm situation of vehicle entry into a dangerous area according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that those skilled in the art to which the present disclosure pertains may easily practice the present disclosure. However, the present disclosure may be modified in various different forms, and is not limited to the exemplary embodiments described herein. Furthermore, in the drawings, portions unrelated to the description are omitted to clearly describe the present disclosure, and similar portions are denoted by similar reference numerals throughout the specification.

Through the specification and the claims, unless explicitly described otherwise, "including" any components will be understood to imply the inclusion of another component rather than the exclusion of another component. Terms including ordinal numbers such as "first," "second" and the like, may be used to describe various components. However, these components are not limited by these terms. The terms are used only to distinguish one component from another component.

Terms such as "~part", "~er/or", and "module" described in the specification may refer to a unit capable of processing at least one function or operation described in the specification, which may be implemented as hardware, a circuit, software, or a combination of hardware or circuit and software.

Hereinafter, the exemplary embodiments of the present disclosure are described with reference to the drawings.

FIG. 1 is a view showing a warning alarm situation of vehicle entry into a dangerous area according to an exemplary embodiment of the present disclosure.

As shown in FIG. 1, a first dangerous area (or a first predetermined area), a second dangerous area (or a second predetermined area), and a third dangerous area (or a third area) may respectively be distinguished by a geofence.

Dangerous areas are predetermined areas and are displayed on the map of the vehicle being driven.

The location of the vehicle, the location of the dangerous area, and whether the vehicle has entered the dangerous area may be detected based on a Global Positioning System (GPS) or Real-Time Location System (RTLS).

An apparatus for warning vehicle entry into a dangerous area may transmit a first alarm when a vehicle of a user enters the first dangerous area. The apparatus for warning vehicle entry into a dangerous area may determine whether the vehicle enters the next dangerous area based on a predetermined monitoring period after the transmission of the first alarm, and transmit a second alarm.

The apparatus may be configured to determine the next dangerous area as the second dangerous area nearest to the first dangerous area. When detecting the vehicle entry into the second dangerous area and receiving the second alarm, the apparatus for warning vehicle entry into a dangerous area may determine whether the vehicle enters the third dangerous area, which is the next dangerous area, and transmit a third alarm based on the predetermined monitoring period.

The apparatus for warning vehicle entry into a dangerous area may calculate the monitoring period based on a driving speed of the vehicle and a distance of the vehicle to the next dangerous area nearest to the vehicle, comparing the calculated monitoring period with a second monitoring period predetermined by a user, thereby determining a final monitoring period. Its details are described with reference to FIG. 2, FIG. 3 and FIG. 4.

Figure 2:
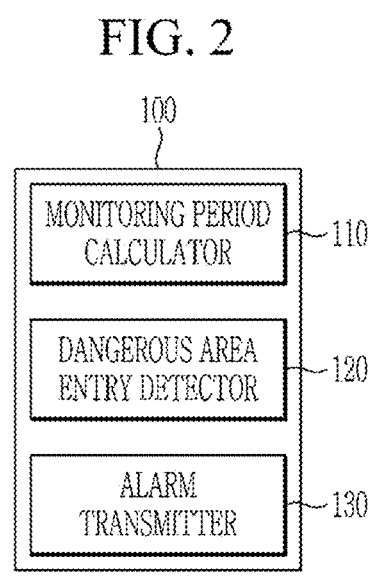

FIG. 2 is a block diagram of the apparatus for warning vehicle entry into a dangerous area according to an exemplary embodiment of the present disclosure.

An apparatus 100 for warning vehicle entry into a dangerous area may be provided through a telematics controller performing control related to a navigation system and/or an infotainment system.

Referring to FIG. 2, the apparatus 100 for warning vehicle entry into a dangerous area may include a monitoring period calculator 110, a dangerous area entry detector 120, and an alarm transmitter 130.

When the vehicle first enters the dangerous area, the apparatus 100 may transmit an initial first alarm through real-time monitoring of a vehicle location for each second.

However, the apparatus 100 may transmit the next alarm when detecting the vehicle entry into the dangerous area in every appropriate monitoring period set by considering a system load.

The monitoring period calculator 110 may calculate the monitoring period for transmitting the next alarm after the initial first alarm is transmitted as the vehicle enters the first dangerous area.

The monitoring period calculator 110 may calculate a first monitoring period based on the driving speed of the vehicle and the distance from the vehicle to the second dangerous area nearest to the vehicle.

The monitoring period calculator 110 may calculate the distance between the vehicle and the second dangerous area based on the GPS information of the vehicle and the location information of the second dangerous area displayed on the driving map.

The monitoring period calculator 110 may determine, as the first monitoring period, a value obtained by dividing the distance to the second dangerous area by the driving speed of the vehicle. Here, the driving speed of the vehicle may be calculated as the maximum speed in a current driving pattern of the vehicle.

The monitoring period calculator 110 receives speed information within the vehicle through a vehicle communication control unit (CCU).

The maximum speed in the current driving pattern or a current driving cycle may be calculated from the vehicle speed to a time point when the first alarm is transmitted. That is, the maximum speed may be determined as the largest value among the driving speeds of the vehicle that are recorded from a time point when the vehicle starts to the time point when the first alarm is transmitted.

For example, the monitoring period calculator 110 may calculate the first monitoring period based on Equation 1 below.

$$I_{new}(s) = D_{min}(m) / V_{max}(\mathrm{m/s}) \quad \text{[equation 1]}$$

Here, $V_{max}$ indicates the maximum speed of the vehicle, $I_{new}$ indicates the first monitoring period, $D_{min}$ indicates the distance to the nearest next dangerous area, and T indicates an elapsed time after the last alarm.

For example, the first monitoring period may be calculated as 0.1 h when 10 km is the distance from the first dangerous area where the vehicle is located to the second dangerous area, and 100 km/h is the maximum speed of the vehicle. 0.1 h may be 360 seconds when converted to seconds (s).

That is, the monitoring period calculator 110 may calculate, as 360 seconds, the first monitoring period for determining whether the vehicle enters the second dangerous area.

The monitoring period calculator 110 may recalculate a new monitoring period based on the maximum speed of the driving pattern of the vehicle and the distance from the vehicle to the third dangerous area nearest to the vehicle, after the second alarm is transmitted as the vehicle entry into the second dangerous area is detected. Here, the maximum speed may be determined as the largest value among the vehicle speeds in the driving pattern of the vehicle that are recorded from the time point when the first alarm is transmitted to a time point when the second alarm is transmitted.

For example, the monitoring period calculator 110 may calculate the monitoring period as 10 h, that is, 600 minutes or 36000 seconds in seconds when 1000 km is the distance between the second dangerous area and the nearest third dangerous area, and 100 km/h is the maximum speed of the vehicle.

That is, the monitoring period calculator 110 may newly calculate the monitoring period whenever each next alarm is transmitted after the first alarm is transmitted.

The monitoring period calculator 110 may recalculate the first monitoring period based on the driving speed of the vehicle and its remaining distance to the second dangerous area when no vehicle entry into the second dangerous area is detected in the first monitoring period.

For example, when no entry into the second dangerous area is detected in an initially-calculated monitoring period of 360 seconds, 1 km is the remaining distance from a current vehicle location to the second dangerous area, and 100 km/h is a current maximum speed, the monitoring period calculator 110 may recalculate the first monitoring period as 36 seconds.

The dangerous area entry detector 120 may determine whether the vehicle enters the second dangerous area in every first monitoring period. Alternatively, the dangerous area entry detector 120 may determine whether the vehicle enters the second dangerous area in every second monitoring period set by the user.

The dangerous area entry detector 120 may compare the second monitoring period set by the user with the first monitoring period calculated by the monitoring period calculator 110 to determine whether the vehicle enters the second dangerous area in every first monitoring period when the first monitoring period is shorter than the second monitoring period.

The dangerous area entry detector 120 may determine whether the vehicle enters the second dangerous area in every second monitoring period when the first monitoring period is longer than the second monitoring period.

That is, the dangerous area entry detector 120 may compare the second monitoring period with the first monitoring period calculated by the monitoring period calculator 110, and monitor whether the vehicle enters the second dangerous area based on a shorter period.

In an exemplary embodiment of the present disclosure, the dangerous area entry detector 120 may compare a value obtained by subtracting the elapsed time after the first alarm from the second monitoring period set by the user with the first monitoring period calculated by the monitoring period calculator 110, and determine whether the vehicle enters the second dangerous area in every first monitoring period when the first monitoring period is shorter than the obtained value.

The dangerous area entry detector 120 may determine whether the vehicle enters the second dangerous area with the value obtained by subtracting the elapsed time after the first alarm from the second monitoring period as the monitoring period when the first monitoring period is longer than the value obtained by subtracting the elapsed time after the first alarm from the second monitoring period.

That is, the dangerous area entry detector 120 may compare a remaining time of the second monitoring period with the first monitoring period, and determine whether the vehicle enters the second dangerous area based on a shorter time.

For example, the dangerous area entry detector 120 may determine whether the vehicle enters the second dangerous area based on the first monitoring period of 4 minutes when 5 minutes is the remaining time of the second monitoring period set by the user and 4 minutes is the first monitoring period calculated by the monitoring period calculator 110 immediately after the first alarm is transmitted in the first dangerous area.

The dangerous area entry detector 120 may determine whether the vehicle enters the second dangerous area by use of 1 minute, which is the second monitoring period, as its monitoring period if it is determined that no vehicle entry into the second dangerous area is made after 4 minutes, 1 minute is the remaining time of the second monitoring period at the current vehicle location, and 2 minutes is the newly calculated first monitoring period.

The alarm transmitter 130 may transmit the second alarm when the vehicle entry into the second dangerous area is determined.

The alarm transmitter 130 may include an in-vehicle telematics system or a V2X (Vehicle to Everything) communication system.

According to an exemplary embodiment of the present disclosure, each of the monitoring period calculator 110 and the dangerous area entry detector 120 of the apparatus may be implemented by a processor (e.g., computer, microprocessor, CPU, ASIC, circuitry, logic circuits, etc.). Each of the monitoring period calculator 110 and the dangerous area entry detector 120 of the apparatus may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Alternatively, the monitoring period calculator 110, the dangerous area entry detector 120, and the alarm transmitter 130 of the apparatus may be integrated in a single processor.

FIG. 3 is a flowchart of a method for warning vehicle entry into a dangerous area according to another exemplary embodiment of the present disclosure. The method for warning vehicle entry into a dangerous area of FIG. 3 may be performed by an apparatus 100 for warning vehicle entry into a dangerous area (see FIG. 2).

In FIG. 3, the apparatus 100 for warning vehicle entry into a dangerous area may transmit a first alarm as a vehicle enters a first dangerous area (S310).

The apparatus 100 for warning vehicle entry into a dangerous area may calculate a first monitoring period based on a driving speed of the vehicle and a distance from the vehicle to a second dangerous area nearest to the vehicle (S320).

The apparatus 100 for warning vehicle entry into a dangerous area may determine the driving speed of the vehicle as the maximum speed in a current driving pattern of the vehicle. Here, the maximum speed in the current driving pattern may correspond to the maximum speed during a vehicle driving until the vehicle transmits the most recent alarm. For example, the maximum speed in the current driving pattern may be the maximum speed among the driving speeds after the vehicle starts before the first alarm is transmitted.

The apparatus 100 for warning vehicle entry into a dangerous area may compare a second monitoring period set by a user with the calculated first monitoring period (S330).

The apparatus 100 for warning vehicle entry into a dangerous area may determine whether the vehicle enters the dangerous area in every shorter period among the first monitoring period and the second monitoring period after the transmission of the first alarm (S340).

The apparatus 100 for warning vehicle entry into a dangerous area may compare the second monitoring period set by the user with the first monitoring period, and determine whether the vehicle enters the dangerous area in every first monitoring period when the first monitoring period is shorter than the second monitoring period.

The apparatus 100 for warning vehicle entry into a dangerous area may determine whether the vehicle enters the dangerous area in every second monitoring period when the first monitoring period is longer than the second monitoring period.

The apparatus 100 for warning vehicle entry into a dangerous area may transmit a second alarm when it is determined that the vehicle enters into the second dangerous area (S350).

Figure 4:
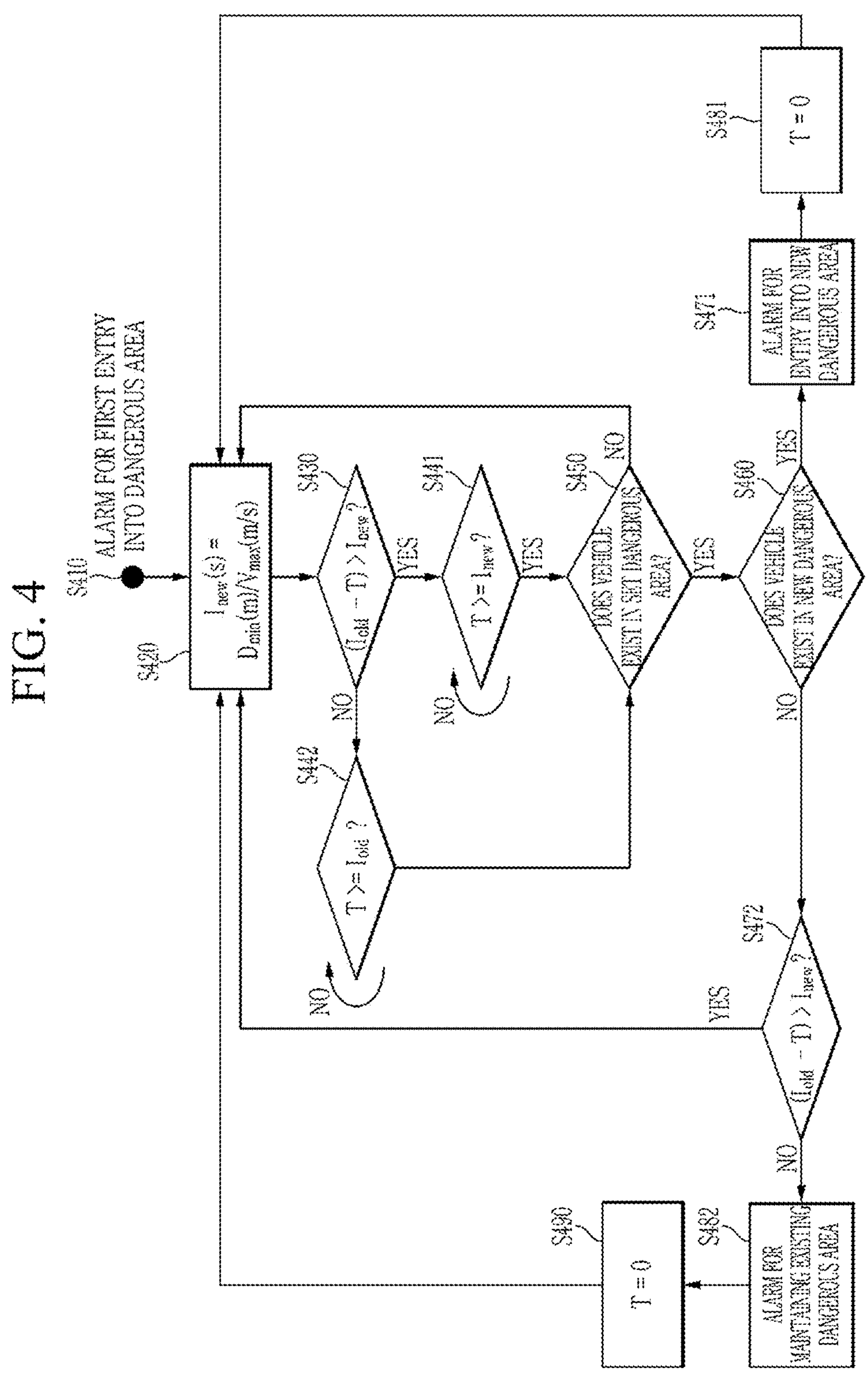
FIG. 4 is a flowchart of the method for warning vehicle entry into a dangerous area according to another exemplary embodiment of the present disclosure.

FIG. 4 is a flowchart of the method for warning vehicle entry into a dangerous area according to another exemplary embodiment of the present disclosure. The method for warning vehicle entry into a dangerous area of FIG. 4 may be performed by the apparatus 100 for warning vehicle entry into a dangerous area (see FIG. 2).

In FIG. 4, the apparatus 100 for warning vehicle entry into a dangerous area may transmit an alarm when the vehicle first enters the dangerous area (S410).

The apparatus 100 for warning vehicle entry into a dangerous area may monitor whether the vehicle enters the dangerous area by setting a monitoring period after an initial alarm is transmitted.

The apparatus 100 for warning vehicle entry into a dangerous area may calculate the first monitoring period based on Equation 1 below (S420).

$$I_{new}(s) = D_{min}(m)/V_{max}(m/s) \quad \text{[equation 1]}$$

Here, Vmax indicates the maximum speed of the vehicle, Inew indicates the first monitoring period, Dmin indicates a distance of the vehicle to the nearest next dangerous area.

The apparatus 100 for warning vehicle entry into a dangerous area may be configured to determine the monitoring period by comparing the second monitoring period set by the user with the first monitoring period based on Equation 2 below (S430).

$$(I_{old} - T) > I_{new} \quad \text{[equation 2]}$$

Here, $I_{new}$ indicates the first monitoring period, $I_{old}$ indicates the second monitoring period, and T indicates the elapsed time after the last alarm.

The apparatus 100 for warning vehicle entry into a dangerous area may compare a value obtained by subtracting the elapsed time after the initial alarm from the second monitoring period with the first monitoring period, set the first monitoring period as the monitoring period when the first monitoring period is shorter than the second monitoring period, and set the second monitoring period as the monitoring period when the first monitoring period is longer than the second monitoring period.

For example, the apparatus 100 for warning vehicle entry into a dangerous area may set the first monitoring period as the monitoring period when zero minutes is the elapsed time, 2 minutes is the first monitoring period, and 5 minutes is the second monitoring period.

The apparatus 100 for warning vehicle entry into a dangerous area may determine whether the vehicle enters the dangerous area, and the first monitoring period is the same as or smaller than the elapsed time after the initial alarm when the first monitoring period is set as the monitoring period (S441 and S450).

For example, the apparatus 100 for warning vehicle entry into a dangerous area may determine whether the vehicle enters the dangerous area if the elapsed time reaches 2 minutes when 2 minutes is the first monitoring period.

The apparatus 100 for warning vehicle entry into a dangerous area may determine whether the vehicle enters the dangerous area, and the second monitoring period is the same as or smaller than the elapsed time after the initial alarm when the second monitoring period is set as the monitoring period (S442 and S450).

For example, the apparatus 100 for warning vehicle entry into a dangerous area may determine whether the vehicle enters the dangerous area if the elapsed time reaches 5 minutes when 5 minutes is the second monitoring period.

When no vehicle entry into the dangerous area is determined, the apparatus 100 for warning vehicle entry into a dangerous area may newly calculate the first monitoring period based on a distance from a current vehicle location to the next dangerous area and the maximum speed of the vehicle, and re-determine a final monitoring period by comparing the newly calculated first monitoring period with the second monitoring period.

The apparatus 100 for warning vehicle entry into a dangerous area may be configured to determine whether the vehicle enters a new dangerous area when determining the vehicle enters the dangerous area (S460).

The apparatus 100 for warning vehicle entry into a dangerous area may transmit an alarm for the vehicle entry into the new dangerous area when determining that the vehicle enter the new dangerous area (S471).

The apparatus 100 for warning vehicle entry into a dangerous area may transmit the alarm for the vehicle entry into the new dangerous area and then reset an elapsed time T after the last alarm to zero (S481).

The apparatus 100 for warning vehicle entry into a dangerous area may then newly calculate the first monitoring period based on Equation 1 with the reset elapsed time T, and compare the newly calculated first monitoring period with the second monitoring period based on Equation 2.

That is, the apparatus 100 for warning vehicle entry into a dangerous area may transmit the alarm for the vehicle entry into the new dangerous area, then reset the elapsed time T after the last alarm to zero, and then repeatedly perform logics of steps S420 to S481.

The apparatus 100 for warning vehicle entry into a dangerous area may compare the value obtained by subtracting the elapsed time after the initial alarm transmission from the second monitoring period with the first monitoring period based on the current location and a current time when determining that the vehicle is in an existing dangerous area rather than the new dangerous area (S472).

For example, the apparatus 100 for warning vehicle entry into a dangerous area may newly calculate the first monitoring period based on Equation 1 if the elapsed time after the initial alarm is currently 2 minutes when 5 minutes is the second monitoring period and 2 minutes is the first monitoring period (S420).

The apparatus 100 for warning vehicle entry into a dangerous area may provide an alarm for maintaining the existing dangerous area based on the second monitoring period if the elapsed time after the current initial alarm is 2 minutes when 3 minutes is the second monitoring period and 2 minutes is the first monitoring period (S482).

The apparatus 100 for warning vehicle entry into a dangerous area may provide the alarm for maintaining the existing dangerous area, and then reset the elapsed time T after the last alarm to zero (S490).

The apparatus 100 for warning vehicle entry into a dangerous area may then newly calculate the first monitoring period based on Equation 1 with the reset elapsed time T, and compare the newly calculated first monitoring period with the second monitoring period based on Equation 2.

That is, the apparatus 100 for warning vehicle entry into a dangerous area may provide the alarm for maintaining the existing dangerous area, then reset the elapsed time T after the last alarm to zero, and then repeatedly perform logics of steps S420 to S490.

Figure 5:
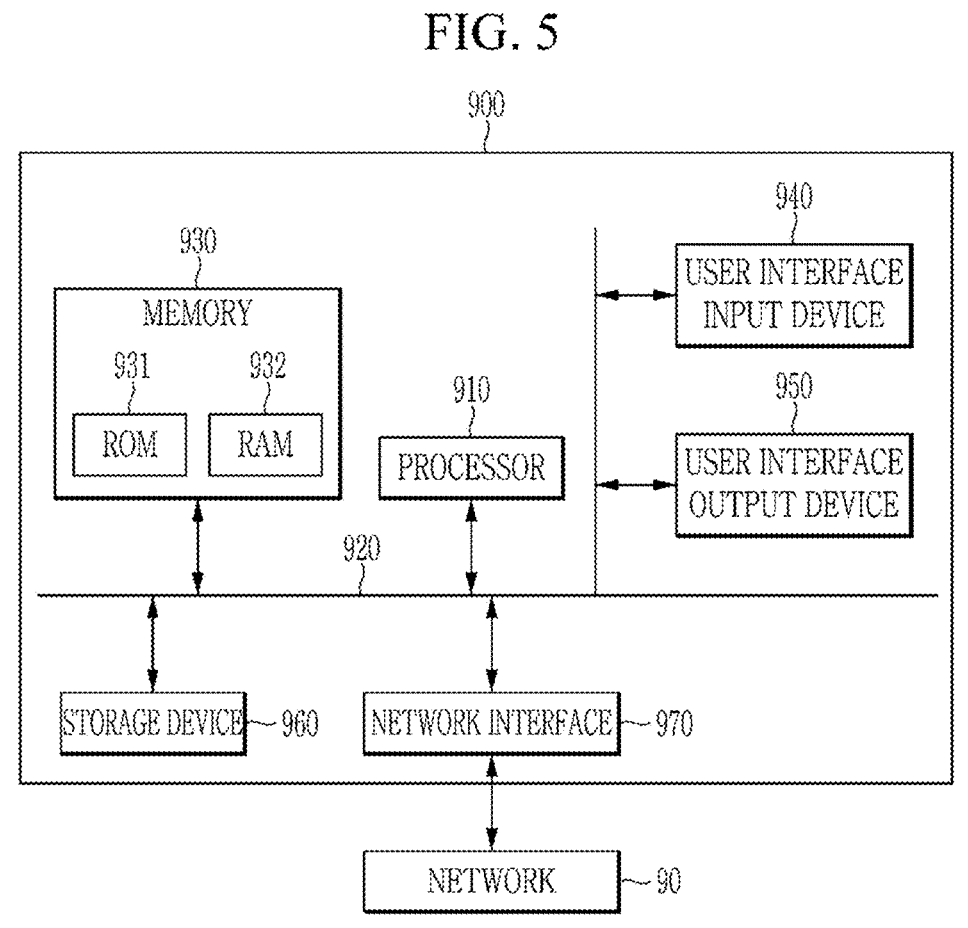

FIG. 5 is a view for explaining a computing device according to various exemplary embodiments of the present disclosure.

Referring to FIG. 5, the apparatus and the method for warning vehicle entry into a dangerous area according to the exemplary embodiments of the present disclosure may be implemented using a computing device 900.

The computing device 900 may include at least one of a processor 910, a memory 930, a user interface input device 940, a user interface output device 950, and a storage device 960 that communicate each other through a bus 920. The computing device 900 may also include a network interface

970 electrically connected to a network 90. The network interface 970 may transmit or receive a signal with another entity through the network 90.

The processor 910 may be implemented in any of various types such as a micro controller unit (MCU), an application processor (AP), a central processing unit (CPU), a graphic processing unit (GPU), and a neural processing unit (NPU), and may be any semiconductor device executing an instruction stored in the memory 930 or the storage device 960. The processor 910 may be configured to implement the functions and methods described above with respect to FIG. 1, FIG. 2, FIG. 3, and FIG. 4.

The memory 930 and the storage device 960 may include various types of volatile or non-volatile storage media. For example, the memory may include a read only memory (ROM) 931 and a random access memory (RAM) 932. In the exemplary embodiment of the present disclosure, the memory 930 may be disposed inside or outside the processor 910, and may be connected to the processor 910 through various means that are well-known.

In various exemplary embodiments of the present disclosure, at least some components or functions of the apparatus and the method for warning vehicle entry into a dangerous area according to the exemplary embodiments of the present disclosure may be implemented as programs or software executed by the computing device 900, and the programs or software may be stored in a computer-readable medium.

In various exemplary embodiments of the present disclosure, at least some components or functions of the apparatus and the method for warning vehicle entry into a dangerous area according to the exemplary embodiments of the present disclosure may be implemented using hardware or circuitry of the computing device 900, or implemented using a separate hardware or circuitry that may be electrically connected to the computing device 900.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for warning vehicle entry into a dangerous area, the apparatus comprising:

a monitoring period calculator determining a first monitoring period based on a driving speed of a vehicle and a distance from the vehicle to a second predetermined dangerous area nearest to the vehicle after an initial first alarm is transmitted as the vehicle enters a first predetermined dangerous area;

a dangerous area entry detector determining whether the vehicle enters the second predetermined dangerous area in every first monitoring period; and an alarm transmitter transmitting a second alarm in response that the dangerous area entry detector detects the vehicle entry into the second predetermined dangerous area.

2. The apparatus of claim 1, wherein the monitoring period calculator is configured to determine, as the first monitoring period, a value obtained by dividing the distance to the second predetermined area by the driving speed of the vehicle.

3. The apparatus of claim 2, wherein the driving speed of the vehicle is determined as a maximum speed in a current driving pattern of the vehicle.

4. The apparatus of claim 3, wherein the maximum speed is determined as a largest value among driving speeds of the vehicle from a time point when the vehicle starts to a time point when the first alarm is transmitted.

5. The apparatus of claim 3, wherein the dangerous area entry detector is configured to:

compare a second monitoring period set by a user with the first monitoring period to determine whether the vehicle enters the second predetermined area in every first monitoring period in response that the first monitoring period is shorter than the second monitoring period, and determine whether the vehicle enters the second predetermined area in every second monitoring period in response that the first monitoring period is longer than the second monitoring period.

6. The apparatus of claim 3, wherein the dangerous area entry detector is configured to:

compare a value obtained by subtracting an elapsed time after the first alarm from a second monitoring period set by a user with the determined first monitoring period;

determine whether the vehicle enters the second predetermined area in every first monitoring period in response that the first monitoring period is shorter than the obtained value; and determine whether the vehicle enters the second predetermined area with the value obtained by subtracting the elapsed time after the first alarm from the second monitoring period as a monitoring period in response that the first monitoring period is longer than the obtained value.

7. The apparatus of claim 1, wherein the monitoring period calculator is configured to determine a new monitoring period based on the driving speed of the vehicle and a distance from the vehicle to a third predetermined area nearest to the vehicle, after the second alarm is transmitted.

8. The apparatus of claim 7, wherein the monitoring period calculator is configured to determine the new monitoring period based on a maximum speed of the vehicle and the distance from the vehicle to the third predetermined area nearest to the vehicle, after the second alarm is transmitted as the vehicle entry into the second dangerous area is detected.

9. The apparatus of claim 8, wherein the maximum speed is determined as a largest value among driving speeds of the vehicle that are recorded from a time point when the first alarm is transmitted to a time point when the second alarm is transmitted.

10. The apparatus of claim 1, wherein the monitoring period calculator is configured to determine a monitoring period based on the driving speed of the vehicle and a remaining distance of the vehicle to the second predetermined area in response that no vehicle entry into the second predetermined area is detected in every first monitoring period.

11. A method for warning vehicle entry into a dangerous area, the method comprising:

transmitting, by a processor, a first alarm as a vehicle enters a first predetermined area;

determining, by the processor, a first monitoring period based on a driving speed of the vehicle and a distance from the vehicle to a second predetermined area nearest to the vehicle;

determining, by the processor, whether the vehicle enters the second predetermined area in every first monitoring period after the transmission of the first alarm; and transmitting, by the processor, a second alarm in response that the processor concludes that the vehicle enters into the second predetermined area.

12. The method of claim 11, wherein the determining of the first monitoring period further includes:

determining, as the first monitoring period, a value obtained by dividing the distance to the second predetermined area by the driving speed of the vehicle.

13. The method of claim 12, wherein the driving speed of the vehicle is determined as a maximum speed in a current driving pattern of the vehicle.

14. The method of claim 13, wherein the determining of the first monitoring period further includes:

comparing a second monitoring period set by a user with the first monitoring period to determine whether the vehicle enters the second predetermined area in every first monitoring period in response that the first monitoring period is shorter than the second monitoring period; and determine whether the vehicle enters the second predetermined area in every second monitoring period in response that the first monitoring period is longer than the second monitoring period.

15. The method of claim 13, wherein the determining of the first monitoring period further includes:

comparing a value obtained by subtracting an elapsed time after the first alarm from a second monitoring period set by the user with the determined first monitoring period;

determine whether the vehicle enters the second predetermined area in every first monitoring period in response that the first monitoring period is shorter than the obtained value; and determine whether the vehicle enters the second predetermined area with the value obtained by subtracting the elapsed time after the first alarm from the second monitoring period as a monitoring period in response that the first monitoring period is longer than the obtained value.

16. The method of claim 11, further including:

redetermining a new monitoring period based on the driving speed of the vehicle and a distance from the vehicle to a third predetermined area nearest to the vehicle, after the second alarm is transmitted.

17. The apparatus of claim 16, wherein the monitoring period calculator is configured to determine the new monitoring period based on a maximum speed of the vehicle and the distance from the vehicle to the third predetermined area nearest to the vehicle, after the second alarm is transmitted as the vehicle entry into the second dangerous area is detected.

18. The apparatus of claim 17, wherein the maximum speed is determined as a largest value among driving speeds of the vehicle that are recorded from a time point when the first alarm is transmitted to a time point when the second alarm is transmitted.

19. The method of claim 11, further including:

redetermining a monitoring period based on the driving speed of the vehicle and a remaining distance of the vehicle to the second predetermined area in response that no vehicle entry into the second predetermined area is detected in every first monitoring period.

* * * * *